(12) United States Patent
Throckmorton et al.

(10) Patent No.: US 12,014,365 B2
(45) Date of Patent: Jun. 18, 2024

(54) SYSTEM AND METHOD FOR BUSINESS PAYMENT INFORMATION DIRECTORY SERVICES

(71) Applicant: National Automated Clearing House Association, Herndon, VA (US)

(72) Inventors: George M. Throckmorton, Urbanna, VA (US); Robert M. Unger, Baltimore, MD (US); Nazih R. Hamade, Lansdowne, VA (US)

(73) Assignee: National Automated Clearing House Association, Herndon, VA (US)

( * ) Notice: Subject to any disclaimer, the term of this patent is extended or adjusted under 35 U.S.C. 154(b) by 0 days.

(21) Appl. No.: 17/515,874

(22) Filed: Nov. 1, 2021

(65) Prior Publication Data

US 2022/0147982 A1    May 12, 2022

Related U.S. Application Data

(60) Provisional application No. 63/107,616, filed on Oct. 30, 2020.

(51) Int. Cl.
*G06Q 20/38* (2012.01)
*G06Q 20/02* (2012.01)

(52) U.S. Cl.
CPC ......... *G06Q 20/389* (2013.01); *G06Q 20/023* (2013.01); *G06Q 20/3827* (2013.01)

(58) Field of Classification Search
CPC . G06Q 20/389; G06Q 20/023; G06Q 20/3827
See application file for complete search history.

(56) References Cited

U.S. PATENT DOCUMENTS 5,794,230 A    8/1998  Horadan et al.
6,173,272 B1   1/2001  Thomas et al.
(Continued)

OTHER PUBLICATIONS

Preibusch, Sören, et al. "Shopping for privacy: Purchase details leaked to PayPal." Electronic Commerce Research and Applications 15 (2016): 52-64. (Year: 2016).*

(Continued)

*Primary Examiner* — David P Sharvin
*Assistant Examiner* — Brock E Turk
(74) *Attorney, Agent, or Firm* — Whiteford, Taylor & Preston, LLP; Gregory M. Stone; Lisa M. Schreihart

(57) ABSTRACT

Disclosed is a system and method for implementing a network enabling an interoperable exchange of electronic payment information, which connects two parties to a transaction using established rules, technology, and trust model. Such systems and methods provide a shared set of rules and common APIs, and enable validation of the accuracy of all data exchanged via API. In order to maintain data, the systems and methods described herein enable each participant to only see interactions and information that is relevant and permissioned to such participant, all while maintaining no central data store for the sensitive electronic payment information. Each participant is vetted and authorized by a system administrator as a validated "Credential Service Provider" ("CSP") and governed by rules created and managed by the administrator. Further, an auditable trail of all transactions is maintained by logging metadata to track events and changes to permissions.

16 Claims, 12 Drawing Sheets

(56) References Cited

U.S. PATENT DOCUMENTS

| | | |
|---|---|---|
| 6,704,714 B1 | 3/2004 | O'Leary et al. |
| 7,146,338 B2 | 12/2006 | Kight et al. |
| 7,165,052 B2 | 1/2007 | Diveley et al. |
| 7,251,656 B2 | 7/2007 | Keown et al. |
| 7,587,363 B2 | 9/2009 | Cataline et al. |
| 7,606,787 B2 | 10/2009 | Keown et al. |
| 7,676,431 B2 | 3/2010 | O'Leary et al. |
| 7,702,579 B2 | 4/2010 | Neely et al. |
| 7,739,227 B2 | 6/2010 | Jordan et al. |
| 7,788,172 B2 | 8/2010 | Kight et al. |
| 7,801,814 B2 | 9/2010 | Cataline et al. |
| 7,831,490 B2 | 11/2010 | Modigliani et al. |
| 7,878,393 B2 | 2/2011 | Henry |
| 7,908,215 B2 | 3/2011 | Armes et al. |
| 7,945,511 B2 | 5/2011 | O'Brien et al. |
| 7,979,348 B2 | 7/2011 | Thomas et al. |
| 8,027,890 B2 | 9/2011 | Kelly et al. |
| 8,090,655 B2 | 1/2012 | Armes et al. |
| 8,195,565 B2 | 6/2012 | Bishop et al. |
| 8,225,992 B2 | 7/2012 | Henry |
| 8,271,381 B2 | 9/2012 | O'Brien et al. |
| 8,285,641 B2 | 10/2012 | Cataline et al. |
| 8,290,835 B2 | 10/2012 | Homer et al. |
| 8,346,659 B1 | 1/2013 | Mohsenzadeh et al. |
| 8,352,365 B1 | 1/2013 | Goldberg et al. |
| 8,380,630 B2 | 2/2013 | Felsher |
| 8,387,074 B2 | 2/2013 | Doran et al. |
| 8,387,868 B2 | 3/2013 | Henry |
| 8,401,942 B2 | 3/2013 | Hansen et al. |
| 8,438,109 B2 | 5/2013 | Armes et al. |
| 8,447,630 B2 | 5/2013 | O'Brien et al. |
| 8,447,693 B2 | 5/2013 | Lynch et al. |
| 8,468,092 B2 | 6/2013 | O'Leary et al. |
| 8,498,941 B2 | 7/2013 | Felsher |
| 8,527,408 B2 | 9/2013 | Campbell et al. |
| 8,560,448 B2 | 10/2013 | Nonni et al. |
| 8,560,452 B2 | 10/2013 | Lynch et al. |
| 8,577,801 B2 | 11/2013 | Armes et al. |
| 8,595,100 B2 | 11/2013 | Kight et al. |
| 8,600,895 B2 | 12/2013 | Felsher |
| 8,620,782 B2 | 12/2013 | Kight et al. |
| 8,645,348 B2 | 2/2014 | Shiloh |
| 8,666,855 B2 | 3/2014 | Armes et al. |
| 8,700,527 B2 | 4/2014 | Dolphin et al. |
| 8,719,163 B2 | 5/2014 | Lynch et al. |
| 8,732,079 B1 | 5/2014 | Durkin et al. |
| 8,751,381 B2 | 6/2014 | Musser et al. |
| 8,762,271 B2 | 6/2014 | Eliscu |
| 8,782,015 B2 | 7/2014 | Enenkiel |
| 8,788,417 B2 | 7/2014 | Armes et al. |
| 8,788,421 B2 | 7/2014 | DuCharme |
| 8,812,381 B2 | 8/2014 | Lemme et al. |
| 8,825,547 B2 | 9/2014 | Milam |
| 8,924,294 B2 | 12/2014 | Lynch et al. |
| 9,063,978 B1 | 6/2015 | Kapoor et al. |
| 9,152,965 B2 | 10/2015 | Boylan et al. |
| 9,208,490 B2 | 12/2015 | Pitroda et al. |
| 9,256,764 B2 | 2/2016 | Aissi et al. |
| 9,270,676 B2 | 2/2016 | Shiloh |
| 9,330,389 B2 | 5/2016 | Pitroda et al. |
| 9,390,228 B2 | 7/2016 | Reid |
| 9,626,664 B2 | 4/2017 | Bouey et al. |
| 9,691,056 B2 | 6/2017 | Bouey et al. |
| 9,928,490 B1 | 3/2018 | Vancini et al. |
| 9,940,622 B2 | 4/2018 | Olliphant et al. |
| 9,990,613 B1 | 6/2018 | Bhatt et al. |
| 10,043,180 B2 | 8/2018 | Mehew et al. |
| 10,078,821 B2 | 9/2018 | Bouey et al. |
| 10,163,099 B2 | 12/2018 | DuCharme |
| 10,185,936 B2 | 1/2019 | O'Leary et al. |
| 10,210,488 B2 | 2/2019 | Kight et al. |
| 10,373,154 B2 | 8/2019 | Kimberg et al. |
| 10,382,445 B1 | 8/2019 | Mantel et al. |
| 10,387,879 B2 | 8/2019 | Thomas et al. |
| 10,467,607 B2 | 11/2019 | Lemme et al. |
| 10,535,064 B2 | 1/2020 | Gordon et al. |
| 10,832,247 B2 | 11/2020 | Durvasula et al. |
| 10,956,973 B1 | 3/2021 | Chang |
| 11,049,106 B2 | 6/2021 | Van Der Laak et al. |
| 2002/0040344 A1 | 4/2002 | Preiser et al. |
| 2004/0210522 A1 | 10/2004 | Bissantz et al. |
| 2005/0182735 A1 | 8/2005 | Zager et al. |
| 2005/0256802 A1 | 11/2005 | Ammermann et al. |
| 2006/0036537 A1 | 2/2006 | Lawrence et al. |
| 2006/0036540 A1 | 2/2006 | Lawrence et al. |
| 2007/0061254 A1 | 3/2007 | Blunck et al. |
| 2007/0063024 A1 | 3/2007 | Guillot |
| 2008/0120238 A1 | 5/2008 | Flitcroft et al. |
| 2008/0222046 A1 | 9/2008 | McIsaac et al. |
| 2009/0070262 A1 | 3/2009 | Olliphant et al. |
| 2011/0137798 A1 | 6/2011 | Armes et al. |
| 2011/0270744 A1 | 11/2011 | Baker et al. |
| 2011/0270748 A1 | 11/2011 | Graham, III et al. |
| 2011/0307388 A1 | 12/2011 | Kim et al. |
| 2012/0066123 A1 | 3/2012 | Armes et al. |
| 2012/0084209 A1 | 4/2012 | Armes et al. |
| 2012/0271761 A1 | 10/2012 | Kight et al. |
| 2013/0191278 A1 | 7/2013 | O'Leary et al. |
| 2014/0129447 A1 | 5/2014 | Ranalli et al. |
| 2014/0137265 A1 | 5/2014 | Dubman |
| 2014/0310177 A1 | 10/2014 | Eliscu |
| 2015/0019944 A1* | 1/2015 | Kalgi ................. G06Q 20/3552 715/205 |
| 2015/0106246 A1 | 4/2015 | Krishna |
| 2015/0363752 A1 | 12/2015 | Kimberg et al. |
| 2016/0048913 A1 | 2/2016 | Rausaria et al. |
| 2016/0300078 A1* | 10/2016 | Wooldridge ............ G06F 21/31 |
| 2017/0140374 A1 | 5/2017 | O'Brien et al. |
| 2017/0243209 A1 | 8/2017 | Johnsrud et al. |
| 2017/0300873 A1 | 10/2017 | Krishna |
| 2017/0364873 A1 | 12/2017 | Turk et al. |
| 2018/0082290 A1 | 3/2018 | Allen et al. |
| 2018/0089639 A1 | 3/2018 | Crum |
| 2018/0089648 A1 | 3/2018 | Groarke |
| 2018/0262335 A1 | 9/2018 | Bergner et al. |
| 2018/0374062 A1 | 12/2018 | Hunter et al. |
| 2019/0012646 A1 | 1/2019 | Seidl et al. |
| 2019/0012647 A1 | 1/2019 | Bouey et al. |
| 2019/0036682 A1* | 1/2019 | Qiu ....................... H04L 9/3265 |
| 2019/0266589 A1 | 8/2019 | Tiwaree et al. |
| 2019/0303926 A1 | 10/2019 | Yantis et al. |
| 2019/0333068 A1 | 10/2019 | Thomas et al. |
| 2019/0340590 A1 | 11/2019 | Davey et al. |
| 2020/0082025 A1 | 3/2020 | Zhou et al. |
| 2020/0097962 A1 | 3/2020 | Gordon |
| 2020/0273016 A1 | 8/2020 | Bajaj et al. |
| 2020/0273031 A1 | 8/2020 | Narayan et al. |
| 2020/0342394 A1 | 10/2020 | Moore et al. |
| 2020/0380482 A1 | 12/2020 | Hoffman et al. |
| 2021/0035073 A1 | 2/2021 | Gupta |
| 2021/0097533 A1 | 4/2021 | Kerr et al. |
| 2021/0166219 A1 | 4/2021 | Kerr et al. |
| 2021/0248610 A1 | 8/2021 | Kurani et al. |
| 2021/0295329 A1 | 9/2021 | Lott et al. |
| 2021/0295352 A1 | 9/2021 | Lott et al. |

OTHER PUBLICATIONS

Felt, Adrienne, and David Evans. Privacy protection for social networking APIs. 2008 Web 2.0 Security and Privacy (W2SP'08) (Year: 2008).*

Kassem et al., "DNS-IdM: a blockchain identity management system to secure personal data sharing in a network," Applied Sciences, Jul. 2019, (9):19 pages.

* cited by examiner

FIG. 8

SYSTEM AND METHOD FOR BUSINESS PAYMENT INFORMATION DIRECTORY SERVICES

CROSS REFERENCE TO RELATED APPLICATIONS

This application is based upon and claims the benefit of U.S. Provisional Application No. 63/107,616 titled "System and Method for Business Payment Information Directory Services," filed with the United States Patent & Trademark Office on Oct. 30, 2020, the specification of which is incorporated herein by reference in its entirety.

FIELD OF THE INVENTION

This invention relates generally to computer-implemented systems and methods for enabling financial transactions through electronic payment networks, and more particularly to computer-implemented systems and methods for the secure sharing of information among parties to a financial transaction through a computer network without centralizing payment-related data or information about the parties to the financial transaction, and for implementing a distributed network for the exchange of electronic payment information among electronically connected and networked payment service providers.

BACKGROUND OF THE INVENTION

In order to carry out an electronic payment transaction, parties to such transaction must share detailed, sensitive information, which may include by way of non-limiting example bank account information, tax related information, and similar types of sensitive and confidential information. In prior systems and methods, such sensitive payment related information has been carried out via direct exchange of the information via bilateral agreements between suppliers and receivers of that information. In this scenario, each entity that is involved in the sharing of such information might participate in from one to a plethora of customer/supplier networks, often carrying out such exchange manually or with only minimal automation.

Employing bilateral agreements in this manner has carried multiple challenges. For example, counterparty trust is limited to the bilateral contracts; authentication controls vary across differing payment information ecosystems; numerous agreements can be expensive and labor-intensive to manage; there are lacking standards for liability and warranty enforcement; adding functionality to aid in the exchange of information requires revisiting each bilateral agreement, thus slowing innovation; and fragmented application programming interface ("API") adoption reduces overall network value. Even the presumably simple task of updating information to, for instance, add a new payer or payee or changing a payer's or payee's account details requires close tracking to ensure up-to-date accuracy of potentially a tremendous number of entities.

In other cases, services have been provided that track such payment related information using a centralized database that may be accessed by the parties involved in such transactions, with the centralized database storing the sensitive payment related information, such as a business-to-business payment network. Such networks are typically proprietary networks that employ permissioned access directories in which data is only accessible to members of that particular network. However, in such proprietary configurations, the data within each network is specific to that network, which makes it quite difficult for parties involved in many transactions with other parties that are members of other networks. The lacking uniformity in data formats, rules, and the like among such disparate network platforms creates a payment data information management challenge that can be quite difficult for payer and payee associated entities to manage.

All of the foregoing challenges have contributed to slow adoption of electronic payments.

In light of the shortcomings of such prior systems and methods, it would be advantageous to provide systems and methods that employ a uniform payment data ecosystem having rules and standards operable across varied proprietary payment data systems, that provide trusted permissioning, validated data, and single points of integration for all participants, that enable a single source of truth and control of data, that enable inclusion of all endpoints of a transaction involving the exchange of electronic payment data, and that enable the rapid deployment of additional services as their needs are identified.

SUMMARY OF THE INVENTION

Disclosed herein are systems and methods for the exchange of electronic information surrounding a payment in order to facilitate wider and faster adoption of electronic payments. Systems and methods configured in accordance with certain aspects of the invention implement a network enabling an interoperable payment information exchange, which network is used to connect two parties to a transaction easily and effectively using established rules, technology, and trust model. More particularly, such systems and methods are configured to enable financial institutions, payment service providers, and similarly situated entities to communicate as "Credentialed Service Providers" ("CSPs") across a trusted communications network that provides interoperability among those CSPs to allow the sharing of information among customers of disparate CSPs relating to a financial transaction between those customers. In accordance with certain aspects of an embodiment of the invention, an interoperable payment information exchange system and method implement a distributed network that provides a standardized platform utilizing a shared set of rules and common APIs that facilitate easy adoption and interoperability. Security of the data and authenticity of individual customer participants is ensured using transport layer security, private certificates, and message signing. Each such participant is vetted and authorized by a system administrator as a validated CSP and is governed by rules that are established by the system administrator. Each such participant is only able to see interactions and information that is relevant and permissioned to them, and there is no central data store of participant's financial or payment-related data or information about the parties to a given financial transaction. Systems and methods configured in accordance with certain aspects of the invention validate the accuracy of all data exchanged via API. Further, an auditable trail of all transactions is maintained by logging metadata to track events and changes to permissions.

In accordance with certain aspects of an embodiment, systems and methods configured in accordance with at least certain aspects of the invention may address the accounts payable challenge of manual and costly supplier onboarding processes that may take weeks to obtain the requisite supplier details. Rather, systems and methods according to aspects of the invention automate onboarding of accurate and trusted payee details not in the current supplier network, and control access to electronic payment information ("EPI") without bilateral agreements.

In accordance with further aspects of an embodiment, systems and methods configured in accordance with at least certain aspects of the invention may address the accounts receivable challenge of manually providing W-9 payment instructions, insurance, certifications, etc. to proprietary customer portals to control information. Rather, systems and methods according to aspects of the invention publish permissioned details to a single source for distribution to all trusted portals.

In accordance with still further aspects of an embodiment, systems and methods configured in accordance with at least certain aspects of the invention may address accounts receivable and accounts payable challenges relating to fraud, such as business email compromise, by employing automatic, verified and trusted customer notifications that automatically update the master record for supplier participants (e.g., billing or invoicing entities participating in the system and method disclosed herein).

In accordance with still yet further aspects of an embodiment, systems and methods configured in accordance with at least certain aspects of the invention may address accounts receivable and accounts payable challenges arising from the use of paper checks that are time consuming, prone to error, and expensive by increasing electronic payment volume through automating the availability of electronic payment details.

Still other aspects, features and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The numerous advantages of the present invention may be better understood by those skilled in the art by reference to the accompanying drawings in which:

FIG. 8 is a schematic view of an exemplary ACH Account Validation screen that may be accessed by a CSP user in the system of FIG. 1.

DETAILED DESCRIPTION OF THE PREFERRED EMBODIMENTS

Figure 1:
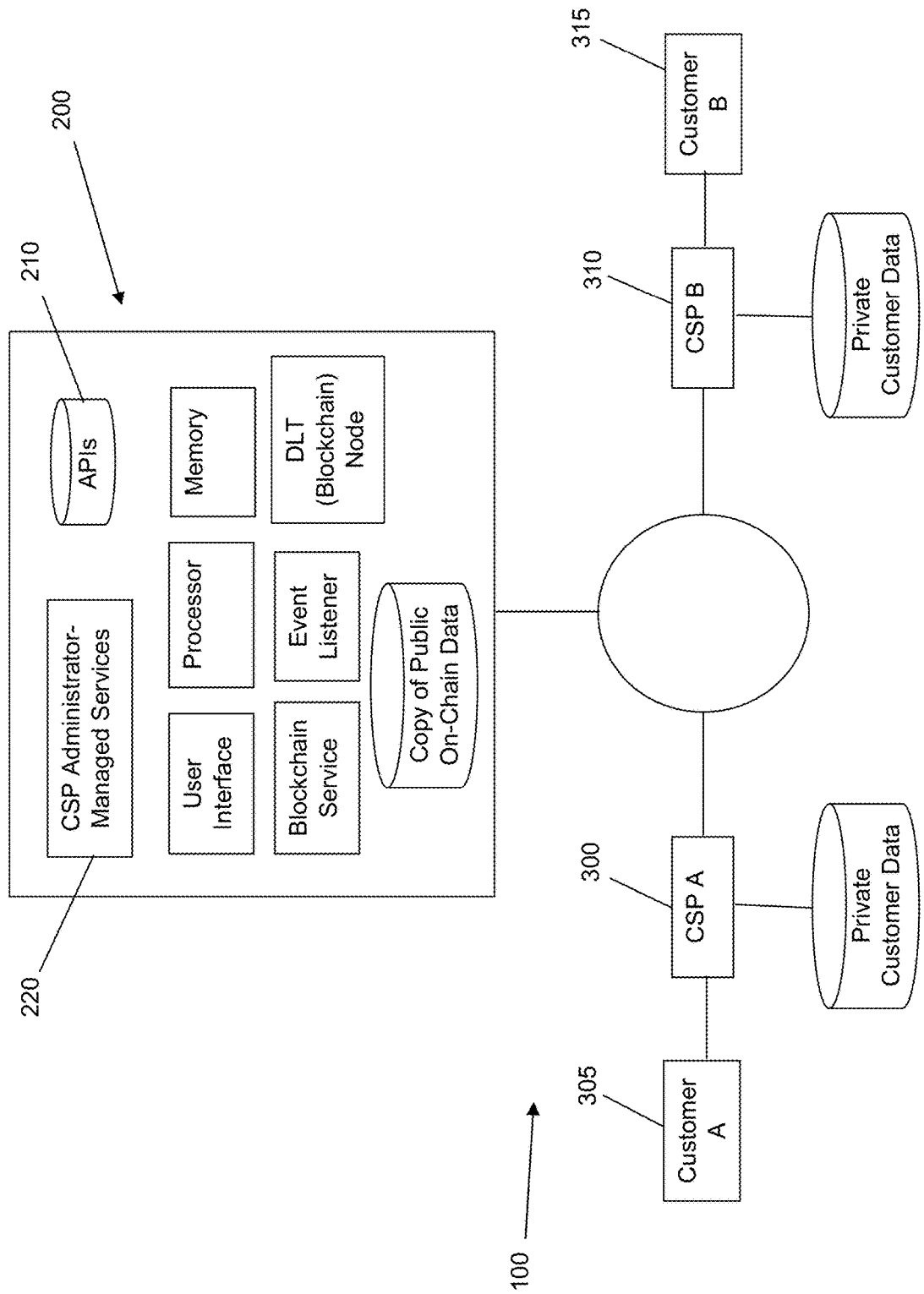
FIG. 1 is a schematic view of a system for implementing a distributed network for the exchange of electronic payment information among electronically connected and networked payment service providers in accordance with certain aspects of an embodiment of the invention.

The invention may be understood by referring to the following description and accompanying drawings. This description of an embodiment, set out below to enable one to practice an implementation of the invention, is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Descriptions of well-known functions and structures are omitted to enhance clarity and conciseness. The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item.

The use of the terms "first", "second", and the like does not imply any particular order, but they are included to identify individual elements. Moreover, the use of the terms first, second, etc. does not denote any order of importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Although some features may be described with respect to individual exemplary embodiments, aspects need not be limited thereto such that features from one or more exemplary embodiments may be combinable with other features from one or more exemplary embodiments.

Unless otherwise indicated, all dimensions shown in the attached drawings are exemplary only and should not be construed as limiting the scope of the invention to those specific dimensions.

By way of summary, systems and methods configured in accordance with at least certain aspects of an embodiment of the invention enable the exchange of information surrounding a payment to facilitate electronic payments. Systems and methods according to aspects of the invention provide an interoperable information exchange comprising an information exchange network designed to connect two parties easily and effectively using established rules, technology, and trust model. Such systems and methods preferably embody at least one or more of the following core principles: (i) it is standardized, employing a shared set of rules and common API's to facilitate easy adoption and interoperability; (ii) it is secure, such that data and authenticity are ensured using transport layer security, private certificates, and message signing; (iii) it is trusted, such that the system can validate the accuracy of all data exchanged via API; (iv) it is private, whereby each participant can only see interactions and information that is relevant and permissioned to them, and there is no central data store; (v) it is authenticated, whereby each participant is vetted and authorized by the system administrator as a validated CSP and governed by system administrator rules; and (vi) it is auditable, whereby metadata is logged to track events and changes to permissions.

In accordance with certain aspects of an embodiment of the invention, FIG. 1 provides a schematic view of a system for implementing a network for the exchange of electronic payment information among electronically connected payment service providers. System 100 includes a distributed network of varied network nodes, which network nodes may include a network administrator 200, at least a first credentialed service provider (herein referred to as a "CSP") 300, at least a second CSP 310, at least a first customer 305 of first CSP 300, and at least a first customer 315 of second CSP 310. Of course, those skilled in the art will recognize that FIG. 1 is a schematic representation only presented for purposes of describing general features of the invention, and that in any implementation system 100 will be comprised of many nodes, including many CSP's of varied forms, and many customers of each CSP.

As used herein, a CSP is an entity that provides payment or payment related services to companies and other entities as their customers. Customers of those CSPs are entities that wish to send and receive payments electronically and in order to do so require access to or need to provide information supporting such payment. Through system 100 configured in accordance with certain aspects of the invention, customers access the functions of system 100 exclusively through their respective CSPs. CSPs, in turn, directly access the functions of system 100, and can offer their customers system-enabled capabilities as part of that CSP's products and services. CSPs typically already hold or see the payment or payment-related information of their customers, which payment or payment-related information will be the subject of sharing through system 100.

Further, system administrator 200 is an administrative entity responsible for operating a central administrative node of the network, manages enrollment, onboarding, and relationship management of CSPs, creates and enforces operating rules for CSP members of the network, and authorizes and creates rules for new services provided to CSPs through system 100.

By way of summary, a network employing system 100 configured in accordance with aspects of the invention enables the exchange of information surrounding a payment in order to facilitate electronic payments. The system enables an interoperable payment information exchange using an information exchange network that allows the connection of two parties to a transaction easily and effectively using established rules, technology, and trust model. Systems configured in accordance with aspects of the invention may provide one or more of the following features: (i) standardization by employing a shared set of rules and common APIs that may facilitate easy adoption and interoperability; (ii) data security through transport layer security, private certificates, and message signing; (iii) assurance of the accuracy of all data exchanged via API through validation; (iv) maintaining data privacy by enabling each participant to only see interactions and information that is relevant and permissioned to them, with no central data store; (v) party authentication through vetting and authorization of CSPs by the system administrator; and (vi) enabling an auditable transaction trail by logging metadata to track events and changes to permissions.

To assist with data anonymity, accuracy, auditing, and overall security, the distributed network created by system 100 employs distributed ledger technology, such as blockchain technology. Such a distributed ledger system provides for hashing of payment-related data, and thus acts as an independent facilitator for private communications and verifier of the information exchanged therein by using one-way hashes and smart contracts. Instead of using a centralized database to hold all of the confidential payment-related data of customers of CSPs in the network, a distributed ledger, such as blockchain, is employed to store public information about a company and a hash (a secure, one-way reference) of any sensitive information. CSPs in the network operate as trusted entities and are responsible for storing the sensitive payment-related information off-chain. Such a system allows parties to an electronic payment transaction to have full control over which entities may access their payment data through a permission-controlled system validated by the participating CSPs. To implement such distributed ledger system, each node of the network (i.e., CSP nodes 30 and 310 and system administrator node 200 in the exemplary, simplified system of FIG. 1) is a node on the blockchain, as discussed in greater detail below. In exemplary configurations, smart contracts on the blockchain are preferably aligned to Ethereum token standards for ERC-721 non-fungible tokens. Hashing is likewise aligned to the Ethereum protocol. Algorithms used in an exemplary configuration are Keccak256 and SHA3.

Each CSP 300 and 310 of system 100 may choose those services offered by system administrator 200 that they wish to offer to their respective customers. For example, with regard to certain aspects of an embodiment, system administrator 200 may offer a suite of data exchange services to CSPs 300 and 310, each of which provide specific functionality, each with a different set of data, rules, and processing as determined by the system administrator 200. Such data exchanges services are implemented by API's 210 that are managed and stored by system administrator 200, and are typically based on an API or set of API's that have been developed by a standards organization. By way of non-limiting example, Afinis Interoperability Standards is an organization that engages the financial industry to develop open standard APIs to support the exchange of payment-related information. Details of Afinis Interoperability Standards are publicly accessible at www.afinis.org. Every data exchange service employed by system 100 preferably makes use of the same trust model, blockchain technology, and guiding principles that support the network. Additionally, the data exchange services employed by system 100 are preferably built on open standards, such as Afinis API standards, that specify the information that will be exchanged between two CSPs. The CSP to CSP communication of API content importantly occurs directly between the two CSPs and not through the system administrator 200, with system administrator 200 serving the role of a mutually trusted entity that facilitates the direct exchange between the two CSPs.

The data exchange services that may be provided through APIs 210 are varied and may be modified and/or supplemented as new business use cases are identified. By way of non-limiting example, such data exchange services may include an electronic payments information exchange service, which enables the sharing of payment-related information between, for example, a product supplier customer of first CSP 300 and a customer of second CSP 310 that is a buyer of product offered by the supplier. In this exemplary case, suppliers, through their respective CSP, create a profile of their Electronic Payment Information ("EPI"). Their EPI profile may contain payment instructions for a Buyer to support a variety of payment types, including by way of non-limiting example ACH, Wire, RTP, Zelle, card and check, etc. The EPI profile can also include Supplier preferences, such as how the Supplier wishes to receive payments in given circumstances. Through the services provided by system administrator 200, the exchange of accurate payment information is ensured because the payment information comes from a CSP who is responsible for handling payments on behalf of that Supplier. Accuracy is further assured through cryptographic verification of the EPI profile each time it is retrieved. Finally, when a Buyer acquires an EPI profile for a Supplier from their CSP using services provided by system administrator 200, they are assured they will be notified via their CSP of changes to that Supplier EPI through the system administrator 200 and can ignore any payment instruction changes for that Supplier that come through other channels.

The data exchange services may further include biller account validation exchange services, which may enable Billers to validate customer account numbers to be included with electronic payments sent to the Biller to ensure proper posting. Providers of Bill Pay services have limited ability to validate the customer account number provided by a consumer or business. If the account number provided does not meet the rudimentary validation, a paper check will be created by the Bill Pay service provider and mailed to the Biller, incurring significant cost for both parties. The biller account validation exchange service enables Bill Pay service providers to confirm that a customer account number provided to them by a consumer or business is valid for that particular Biller. Biller Account Validation through system administrator 200 ensures an authoritative validation of biller account numbers so that payments can be made electronically by the Bill Pay service provider and seamlessly posted by the Biller.

The data exchange services may still further include ACH account validation exchange services, which allow a CSP to request validation for ACH Credit and Debit accounts, on behalf of a Participant, and receive a response in real-time that the given account is enabled, disabled, or unable to locate the account. The ACH account validation exchange service provides an efficient way to satisfy industry requirements that businesses initiating consumer ACH debits via the Internet or mobile devices verify the ability of an account to receive an ACH instruction prior to making the first ACH request. The service can also be used for other purposes as well to augment best practices for verifying the status of a business, or consumer account prior to initiating a credit or debit ACH payment.

Figure 3:
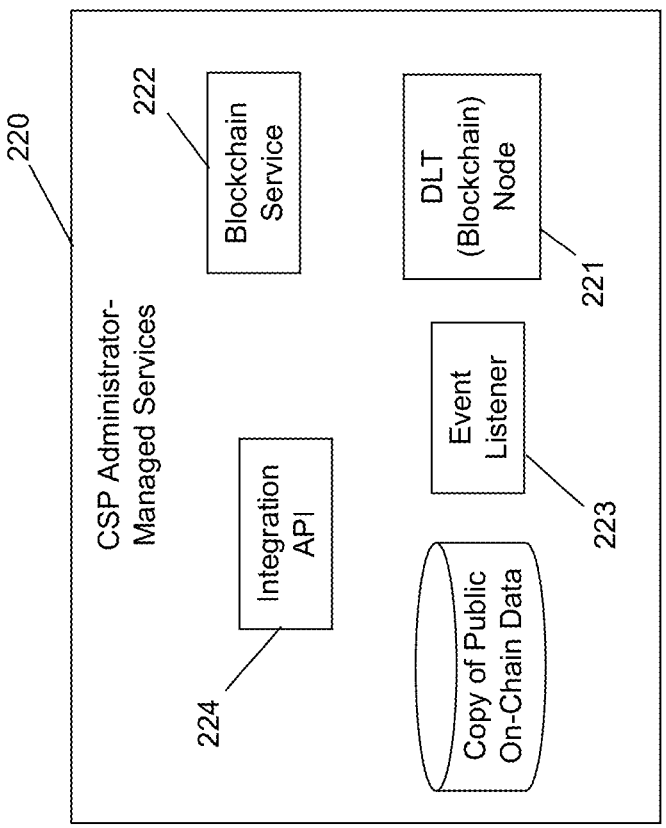
FIG. 3 is a schematic view of CSP Administrator-Managed Services offered from a system administrator computer in the system of FIG. 1.
Figure 2:
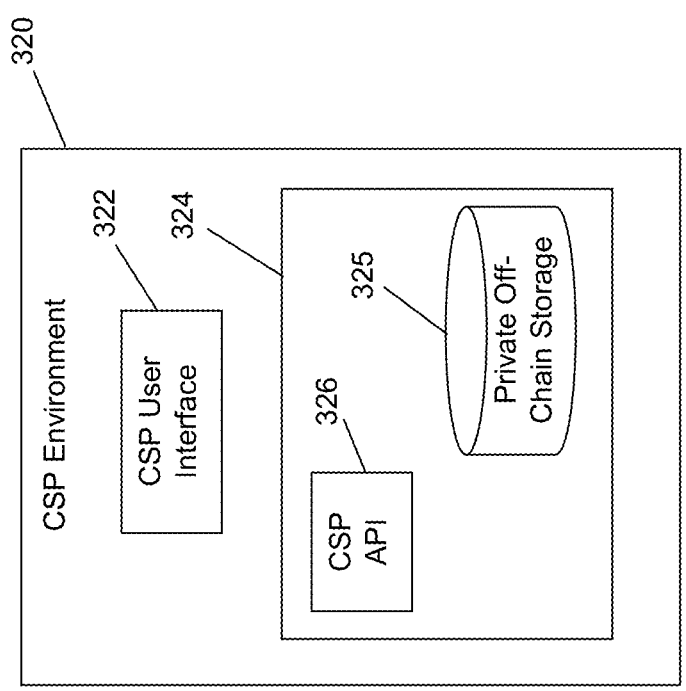
FIG. 2 is a schematic view of a computer-implemented CSP environment for use with the system of FIG. 1 and that allows the CSP to access the services offered by a system administrator.

With continued reference to FIG. 1, each of first CSP 300, second CSP 310, and system administrator 200 may be configured as a node on a distributed network, which may communicate with one another via a wide area network such as the Internet. In order to engage with system 100, each CSP has a computer-implemented CSP environment 320 as shown in FIG. 2 that allows the CSP to engage with CSP managed services 220 (shown in detail in FIG. 3 and discussed in greater detail below) to access the services offered by system administrator 200. In certain configurations, the CSP environment 320 is hosted on a computer associated with its respective CSP, while in other configurations the CSP environment 320 may be hosted by the system administrator 200 and dedicated to a single CSP. Likewise, in certain configurations the services encompassed by CSP managed services 220 may be hosted by system administrator 200, while in other configurations one or more of those services may be hosted by a computer associated with a respective CSP. Such configurations may vary from CSP to CSP depending upon the extent of custom integration that a CSP wishes to take on themselves as opposed to having functions hosted entirely by the system administrator 200.

System 100 configured in accordance with aspects of the invention and with reference to FIG. 1 operates as a distributed system with an independent central authority. As noted above, this is achieved using distributed ledger technology (DLT) leveraging a Rules Engine that is powered by smart contracts. The rules engine is maintained exclusively by the system administrator and correlates to the written operating rules agreed to by all network members for the network and any exchange services. In an exemplary configuration, CSPs are not required to write a rules engine in order to participate, nor is there a need to build anything to compile or execute smart contracts. CSPs that do not write their own blockchain interaction layer, or host their own blockchain node, preferably have the same capabilities and are able to execute the same smart contracts as others on the network through RESTful API endpoints.

System 100 comprises secure groupings of microservices that all speak through RESTful APIs, encrypted via transport layer security ("TLS"), and ensure authorized communication using X.509 certificates. Each CSP has a defined entry point into the network that has the same core components. The microservices provided to each CSP may generally be grouped into (i) core administrator environments, (ii) CSP environments, and (iii) CSP administrator-managed environments.

The core administrator environment is managed by system administrator 200, and preferably includes an administrative central directory (i.e., a catalog of searchable public information applicable to each data exchange service in order to facilitate network transactions), maintains smart contracts with other nodes on the network, maintains certificate authorities, manages data exchange services, and enables network onboarding and offboarding. The core administrator environment carries out the core services of the distributed application that allows the network formed by system 100 to operate, and provides a directory API endpoint enabling access to the administrative central directory. The system administrator 200 manages these on behalf of each CSP, hosting the functionality that provides access to the distributed ledger.

The CSP environments 320 in certain configurations are self-hosted by each CSP, although in certain alternative configurations they may be provided as a managed service by the system administrator 200. CSP environments include a user interface 322 enabling the CSP to interface with the network and its data exchange services, and a CSP back-end 324 that may include storage 325 for storing private, off-chain data, and an API back-end 326 to bridge the CSP environment 320 (e.g., user interface, storage) and the CSP administrator-managed environment 220, discussed below (e.g., DLT node, data exchange service interactions, etc.).

The CSP administrator-managed environments 220 in certain configurations are provided as a managed service by the system administrator, although in certain alternative configurations they may be self-hosted by a CSP. The CSP administrator-managed environments 220 establish a DLT/blockchain node 221, provide blockchain services 222 for generating and signing blockchain transactions, including key management and orchestration, provide services for reading/receiving blockchain events, and provide data exchange service-specific endpoints to interact with data exchange service smart contracts. In an exemplary configuration, all interaction between CSPs and the network occur through integration services provided by administrator-managed environments 220. These services create a presence on the network, correlating the reading of directory information with public information, and writing all updates to the ledger through the blockchain services 222.

Blockchain services 222 handle all writing of data to the blockchain. Those services provide a uniform interface for other services, and normalize the data between services prior to writing to or reading from the blockchain. This separation of concerns helps provide flexibility with regard to the underlying ledger technology and minimizes authorization and network traffic rules required to secure the ledger from the rest of the network.

Likewise, providing a DLT or blockchain node 221 enables the CSP to operate as one of many nodes in the distributed ledger, which provides an immutable record of transaction history to create an auditable log of transactions and synchronize network data in near real-time. The distributed network provided by system 100 is a private network, blocked off from outside access both with network security and with rule governance. Preferably only the system administrator 200 may modify the functionality of smart contracts. The smart contracts themselves contain rules engine functionality that enforces authorization of the two parties in an information exchange, ensuring that both are permitted to operate on the network. The smart contracts employed by system 100 provide structure, state, and business logic to the exchange services. These smart contracts are also used to emit events for specific transactions, allowing blockchain nodes to listen for these particular events and notify the relevant parties.

The CSP administrator-managed environments 220 preferably include an event listener 223. When a transaction is signed on the blockchain, there are a number of parties that may be interested in updated information. For example, one CSP's customer may have previously received EPI, which EPI may since have been updated. As these blockchain events happen, two important actions are triggered. First, the information is written to a database that stores the most up-to-date public information, thereby allowing lookups of the event data without having to peruse the entire blockchain. Second, an event is produced that travels to any downstream consumers listening for that type of information, thereby allowing for the CSP administrator-managed services 220 to push notifications to all CSPs through web sockets.

Each of the environments discussed above communicate via APIs. Integration APIs 224 are API endpoints residing in the CSP administrator managed services environments 220, and provide the entry point for all CSP-side contact with the network. Directory APIs, as mentioned above, reside in the core administrator environment and provide the searchable, public central directory. Exchange service APIs 210 are maintained by system administrator 200. System 100 exists to enable a trusted exchange of the APIs that support each specific data exchange service. Exchange services APIs 210 are based on industry standards and are the means of exchange of exchange serviced payload information directly between CSPs. The exchange service API is the industry standard API(s) (e.g., those developed using Afinis Interoperability Standards) on which the particular data exchange service is based. Blockchain services 222 use blockchain API endpoints residing in the CSP administrator managed services environment 220, which are used internally to facilitate blockchain interactions, such as generating and signing transactions.

System 100 may employ electronic access tokens as unique identifiers for the granted trust between two CSPs to exchange specific information. Internally, such electronic access tokens are addresses that represent transactions on the blockchain where rules engine smart contracts have authorized, and are keeping track of, the exchange of information. Each electronic access token on the blockchain has a status to designate the current state of that token. In an exemplary configuration, those states may include (i) issued, in which a requestor may make one specific request based on an exchange service, CSP, and decentralized identifier (DID), on behalf of a particular DID; (ii) rejected, in which a respondent will not fulfill the request, (iii) consumed, in which a respondent has fulfilled the request but it has not yet been verified, and (iv) verified, in which a requestor has confirmed the supplied information by comparing the respondent's hash with the appropriate blockchain record. Optionally and in certain configurations, additional token states may be provided, particularly to facilitate extra final states, interstitials, or dependency gates required for the exchange services' functionality, which additional token states may include (v) pending, in which a respondent will not fulfill the request until a workflow step has been completed, and (vi) approved, in which a respondent will now fulfill a subsequent request. The varied access token states are enforced within the rules engine smart contracts for a particular exchange service.

Figure 4:
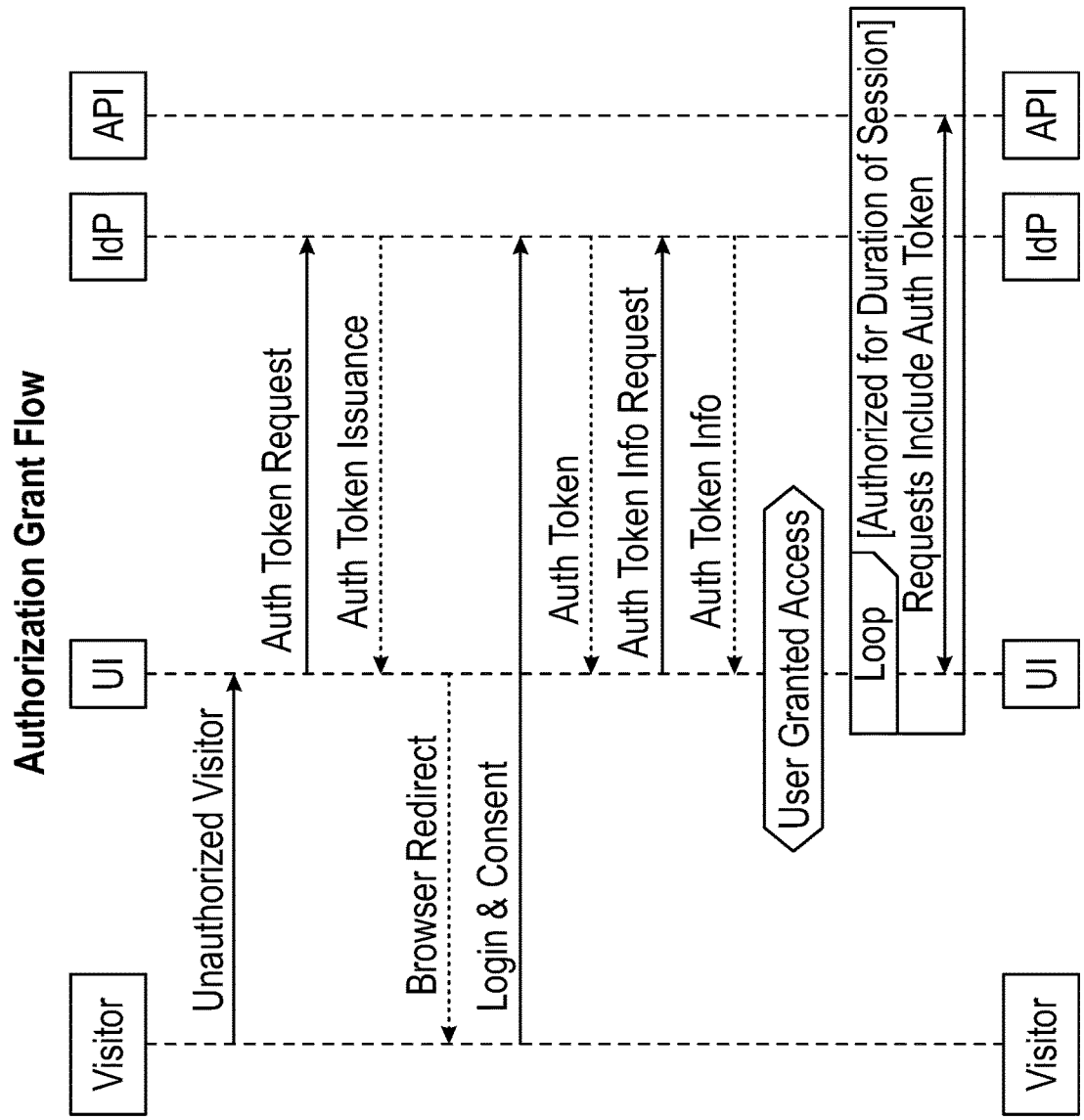
FIG. 4 is a sequence diagram for authenticating a CSP user in the system of FIG. 1.
Figure 5:
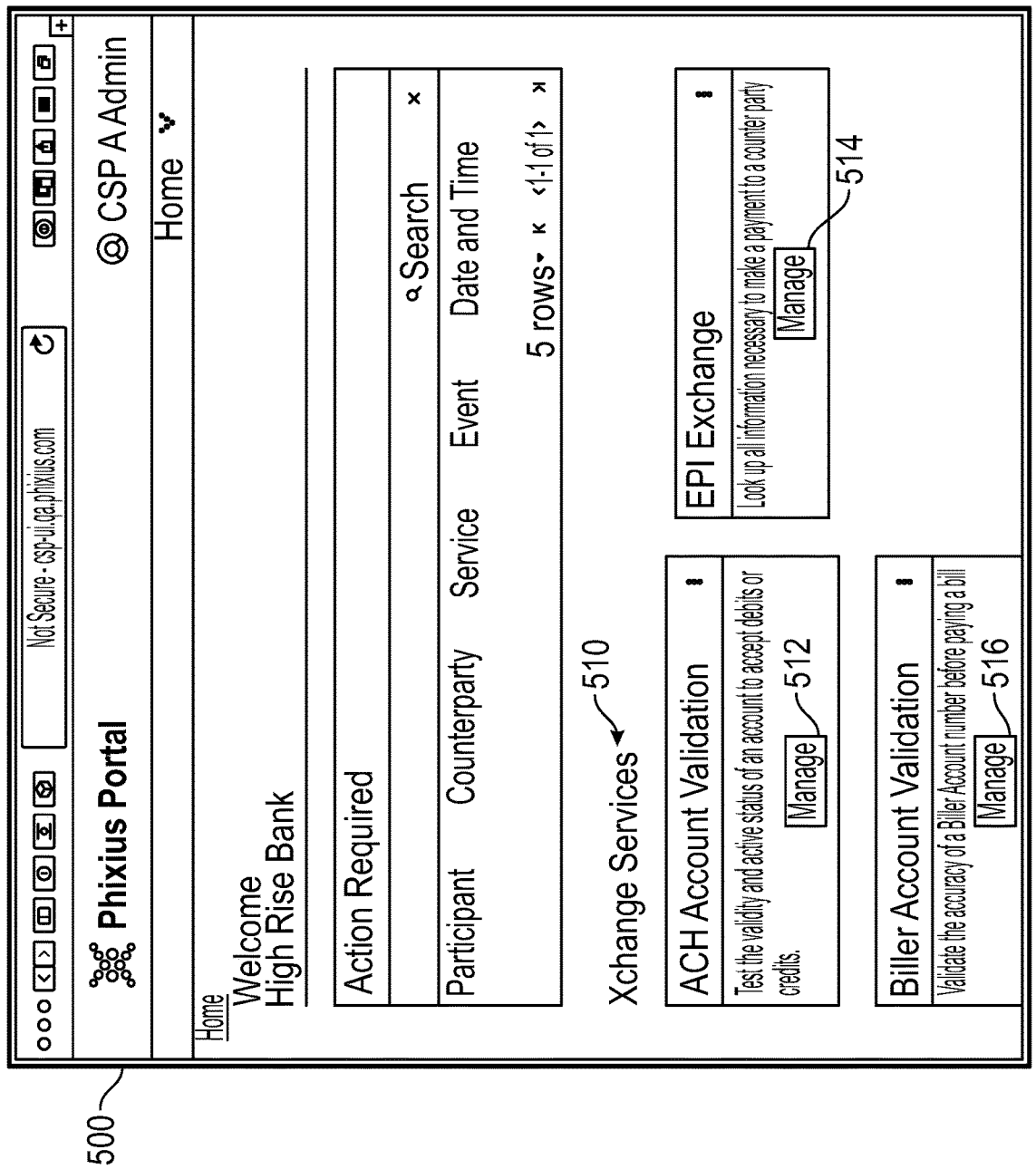
FIG. 5 is a schematic view of a user interface screen providing an exemplary homepage that may present a CSP user with various data exchange services when using the system of FIG. 1.

In order for a particular user at a CSP to access the CSP administrator-managed services 220 particularly in a fully administrator-hosted implementation, a CSP must be authenticated, and should complete an Identity Provider ("IdP") integration as part of the network onboarding process. As shown in FIG. 4, such authorization may be carried out by first having an unauthenticated user redirected to the CSP's IdP in order to request the user to login (if not already cookied/signed-in) with their browser, as required, which will then redirect the user back with an appropriately signed authorization bearer token. In exemplary configurations, this is in the form of a JSON Web Token that is then stored as a secure session cookie in the visitor's browser, included in the HTTP headers of all further communications with the CSP-API in order to identify and grant the user access. As shown in the exemplary view of FIG. 5, once logged in the CSP user will then be presented a homepage 500 that may present the user with various data exchange services 510 that they may engage, such as by way of non-limiting example ACH Account Validation 512, EPI Exchange 514, and Biller Account Validation 516.

Figure 6:
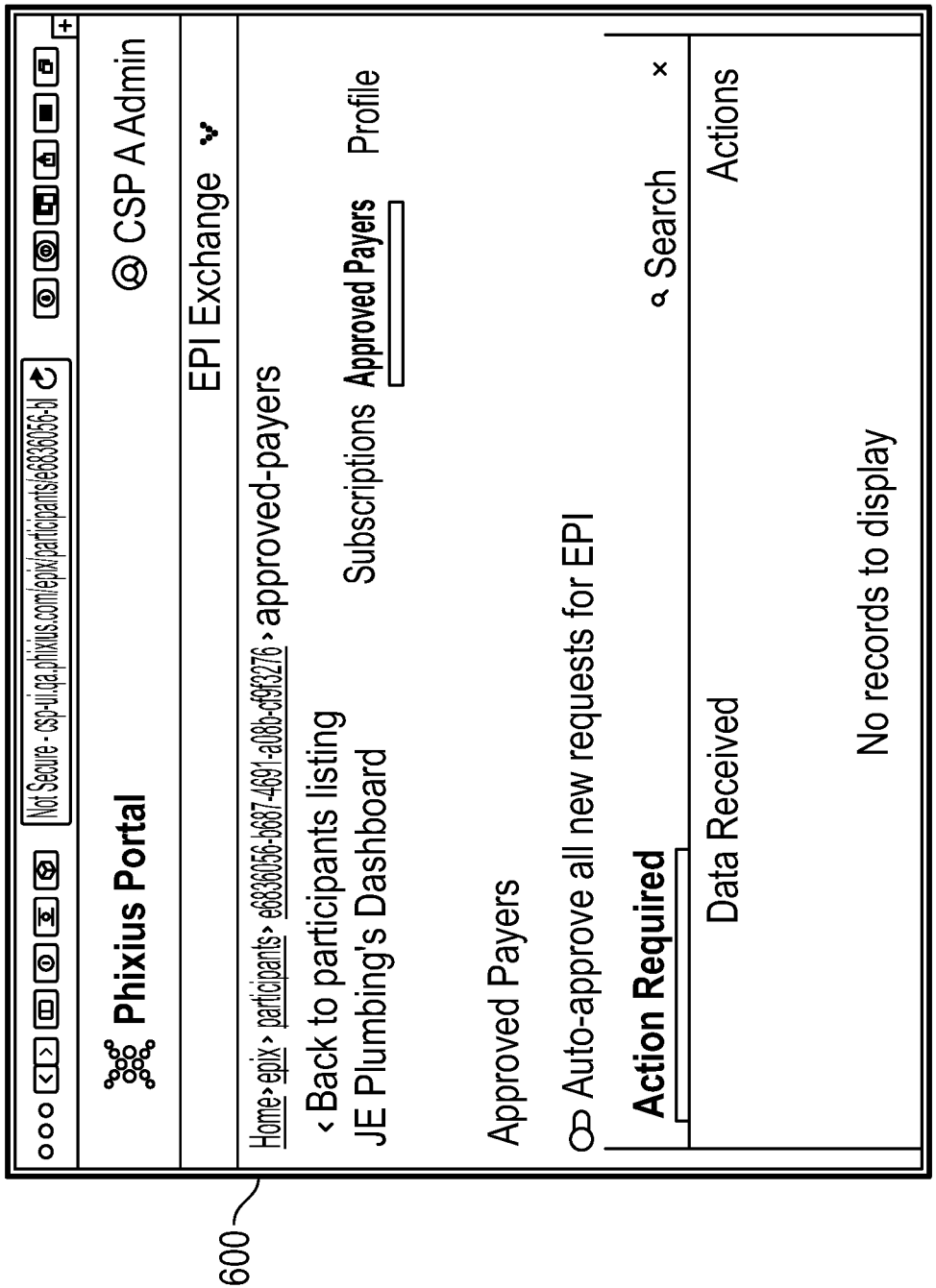
FIG. 6 is a schematic view of an exemplary user interface screen providing an exemplary CSP customer dashboard that may be accessed by a CSP user in the system of FIG. 1.

When initiating an EPI exchange service 514, the user is initially presented a list of participants or CSP customers approved for that data exchange service. As shown in the exemplary view of FIG. 6, a particular CSP customer or participant dashboard screen shows that entity's subscriptions to EPI updates from other CSP customers/participants on other CSPs in the network. When another participant or CSP customer to whom the currently viewed CSP customer is subscribed has updated their EPI, the user may be prompted to take action with regard to such updated data in, for example, an "Action Required" alert. Additionally, the individual CSP customer dashboard 600 may allow the CSP user to view an "Approved Payers" tab, which presents the CSP user a list of which, if any, CSP customers or participants for which the currently viewed CSP customer/participant has approved their ability to pull the currently viewed CSP's EPI. If there are new requests that require approval by the CSP, those likewise may be presented on dashboard 600 in the "Action Required" alert. Still further, a "Profile" tab may allow viewing and editing of the directory profile and EPI information of the CSP customer currently being viewed. This is the information that other CSP customers/participants will see by searching for that CSP customer/participant in the central directory, as well as the actual privately stored EPI that will be shared.

When a CSP customer/participant is to engage in an electronic payment transaction with an entity with whom they have not previously conducted transactions (and thus an entity for whom they have not yet obtained EPI), that CSP customer/participant may request that the CSP obtain EPI for that new entity. An EPI profile may be requested by engaging a "Get EPI" function, for instance after having identified a party through a search of the public directory. In order for a requestor to receive a CSP customer's EPI, approval may be required. In order to approve a requestor on behalf of their CSP customers/participants, a CSP may enter the associated participant's dashboard and engage an "Approved Payers" tab, at which they will be notified of pending EPI requests requiring authorization.

As noted above, one of the exchange services that may be provided by system 100 is the biller account validation exchange service, which facilitates a query for validating the legitimacy and existence of an account number for a particular biller address, providing additional confidence that a payee's payment will be sent to the correct biller. In supporting the biller account validation exchange service, system 100 both provides a common implementation interface for the biller account validation exchange service, and serves as a mechanism to authorize and connect two parties. In an exemplary configuration, the biller may build a biller account validation exchange service endpoint to specification, and then integrate that into backend systems that can complete the lookup. As system 100 does not have any knowledge of customer account numbers, there is no facility for registering accounts, searching accounts, or validating that the account number is accurate. However, system 100 stores a hash of both the query and the counterparty's response on the blockchain in order to provide the requestor with immediate, and future, validation that the information intended for them was received properly.

Figure 7:
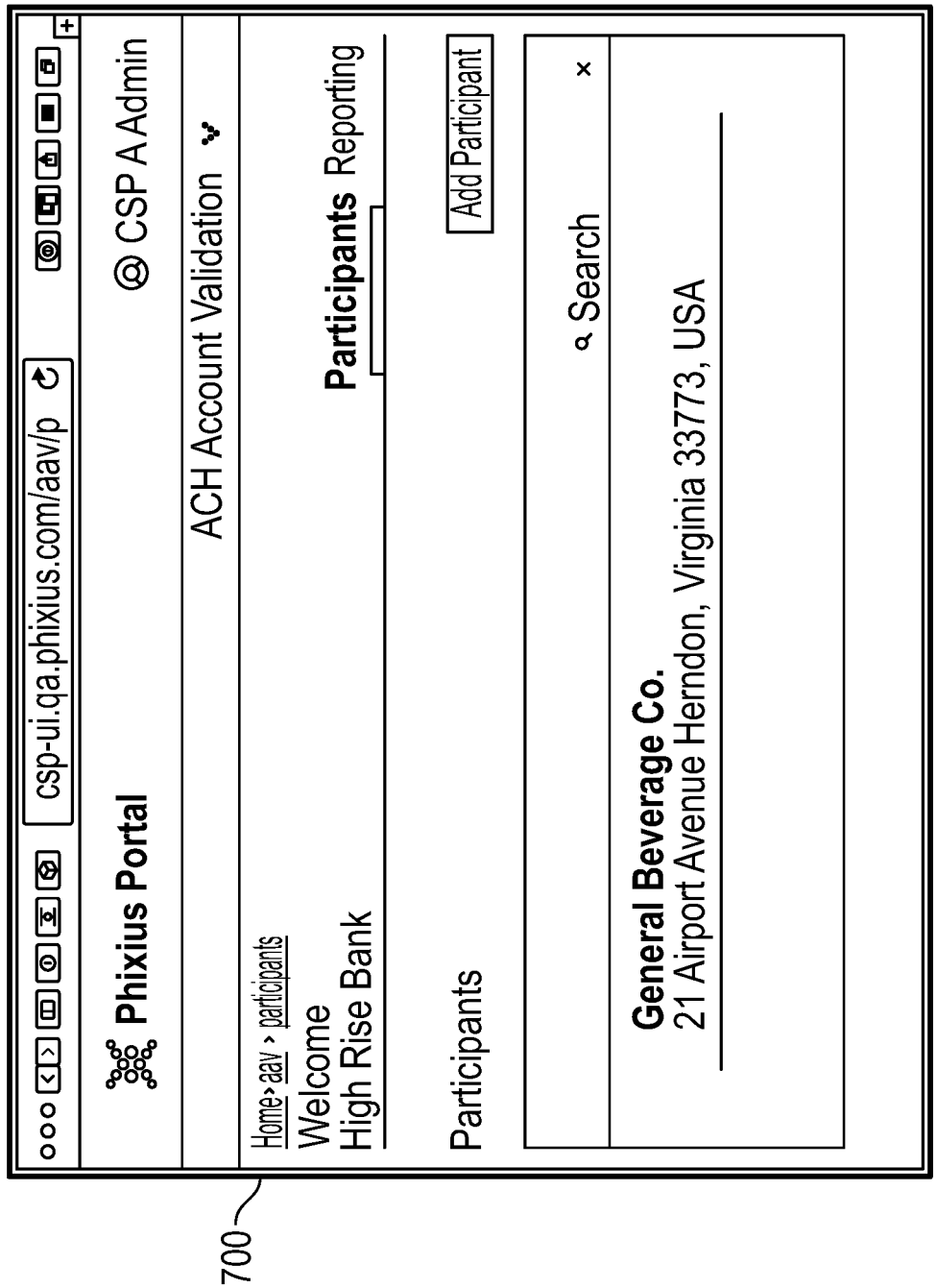
FIG. 7 is a schematic view of an exemplary participant selection page that may be accessed by a CSP user in the system of FIG. 1.
Figure 8:
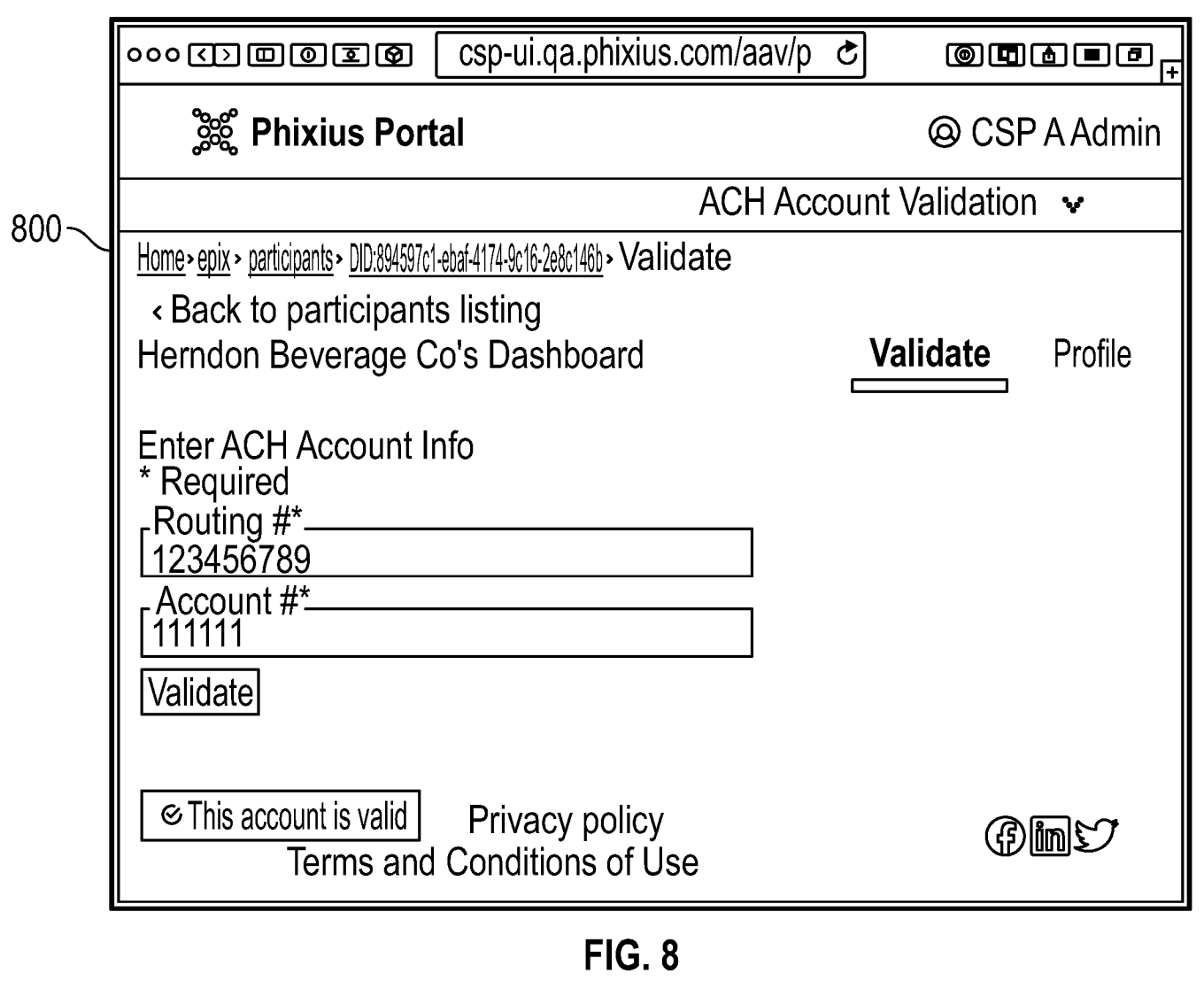

Also as noted above, another one of the exchange services that may be provided by system 100 is the ACH account validation exchange service, which allows CSPs to request validation for bank accounts and receive a response in real-time that the given account is valid, closed, or unable to be found. In order to validate an ACH account number, a CSP user may select the ACH Validation Exchange Service 512 (FIG. 5) from the home page. As shown in the exemplary view of FIG. 7, the user may then be presented a participant selection page 700 listing CSP customers/participants, at which point the CSP user chooses the particular CSP customer/participant on whose behalf the ACH account validation request is being made. Once the particular CSP customer/participant has been selected, in order to validate the ACH account and routing number, the CSP user enters the supposed ACH account and routing number into an ACH Account Validation screen 800 (FIG. 8), after which an indicator will appear on the screen providing an answer of whether the account was found, and if it is valid or not valid.

As noted above, integration APIs 224 are API endpoints residing in the CSP administrator managed services environments 220, and provide the entry point for all CSP-side contact with the network. While the integration APIs 224 provide a CSP with all of the functionality required to transact using system 100 and engage the data exchange services subscribed to, all private CSP customer/participant data remains in private off-chain storage associated with the particular CSP, such as in certain exemplary configurations on the CSP's private network and thus does not interact with system 100 in any manner. Rather, any private information exchange with other CSPs will occur directly between the CSPs involved in a given transaction, authorized by system access tokens and subject to the system operating rules and rules governing the given data exchange service. CSPs may additionally use API access to interface with the Directory API for data exchange services that leverage this directory. Public directory lookup data is provided to this central directory and stored on behalf of the CSP.

Authentication of CSPs to the network formed by system 100 may be enabled through use of x.509 certificates. In this configuration, all communication between the CSP's environment 320 and the CSP administrator-managed services environment 220 or core environment will require the usage of x.509 certificates. Upon joining the network, CSPs generate a certificate signing request and send it to the system certificate authority for signing. All communications that a CSP initiates with the network require a signature using this x.509 certificate to prove its identity to the network.

Additionally, the public key associated with a CSP's x.509 certificate is shared with the network via the blockchain to allow network participants to validate incoming requests. CSPs receiving external requests from other network CSP's will therefore perform two checks when authenticating incoming requests: (1) ensuring that the certificate authority signed the x.509 certificate used in signing the incoming request, and (2) checking that the x.509 certificate used in signing the incoming request is registered and active on the network.

CSPs also in exemplary configurations have their private/public transaction signing key pairs managed by their Integration API 224, and stored securely in escrow within a key vault owned by system administrator 200. The key vault access is tightly controlled and is not available to users or developers, with the invocation of the keys handled at runtime by the server code. The Integration API will only use the key vault when receiving an API call signed by the CSP's valid x.509 certificate.

All of the data exchange services provided by system administrator 200 employ a common functionality that (i) identifies who the two CSPs are; (ii) ensures that each CSP is authorized to participate in the selected data exchange service; and (iii) provides a system access token that represents the valid smart contract on the blockchain that grants authorization for the exchange.

Additionally, each exchange service may have unique requirements that necessitate additional services. Each exchange service provided by system 100 shares the following similarities. First, the system 100 issues an access token as described above, representing the address of a smart contract on the blockchain, upon authorizing the request through the rules engine. The originating CSP and the counterparty CSP must both be members of the network formed by system 100, and must be identified with a valid certificate and public key permitted to operate on the network, and likewise must each be permitted for the selected data exchange service. Likewise, the access token is only valid for the particular request between these two parties, and the state can only be advanced in a forward direction to ensure that it cannot be reused. Second, the counterparty checks the validity and status of the access token, and must update the access token appropriately (e.g., modifying its status to pending, consumed, etc.). Third, any payload received from the counterparty is validated by the originating party by a hashed value stored on the blockchain, and then the receiving CSP must update the access token appropriately (e.g., modifying its status to verified).

While the exchange service operates through system 100 to ensure proper authorizations exist to engage with parties in network 100, such that network 100 serves as a trusted partner to ensure trust in a direct exchange of information between two CSPs, it is important to note that the actual exchange service that is ultimately carried out is directly between the two CSPs. The system administrator 200 thus never sees the payload data shared between CSPs as the exchange occurs directly between those CSPs outside of the network.

The EPI exchange service will now be discussed in greater detail. The EPI exchange service allows for an implementation of a payee profile API, with the exception that a requestor sends an access token along with a valid request that conforms to system specifications. The requestor begins by generating an access token, then makes a payee profile API call to the counterparty using the generated access token, and finally, the requestor verifies the hash of the received payee profile API payload with the hash stored on the blockchain.

Figure 9:
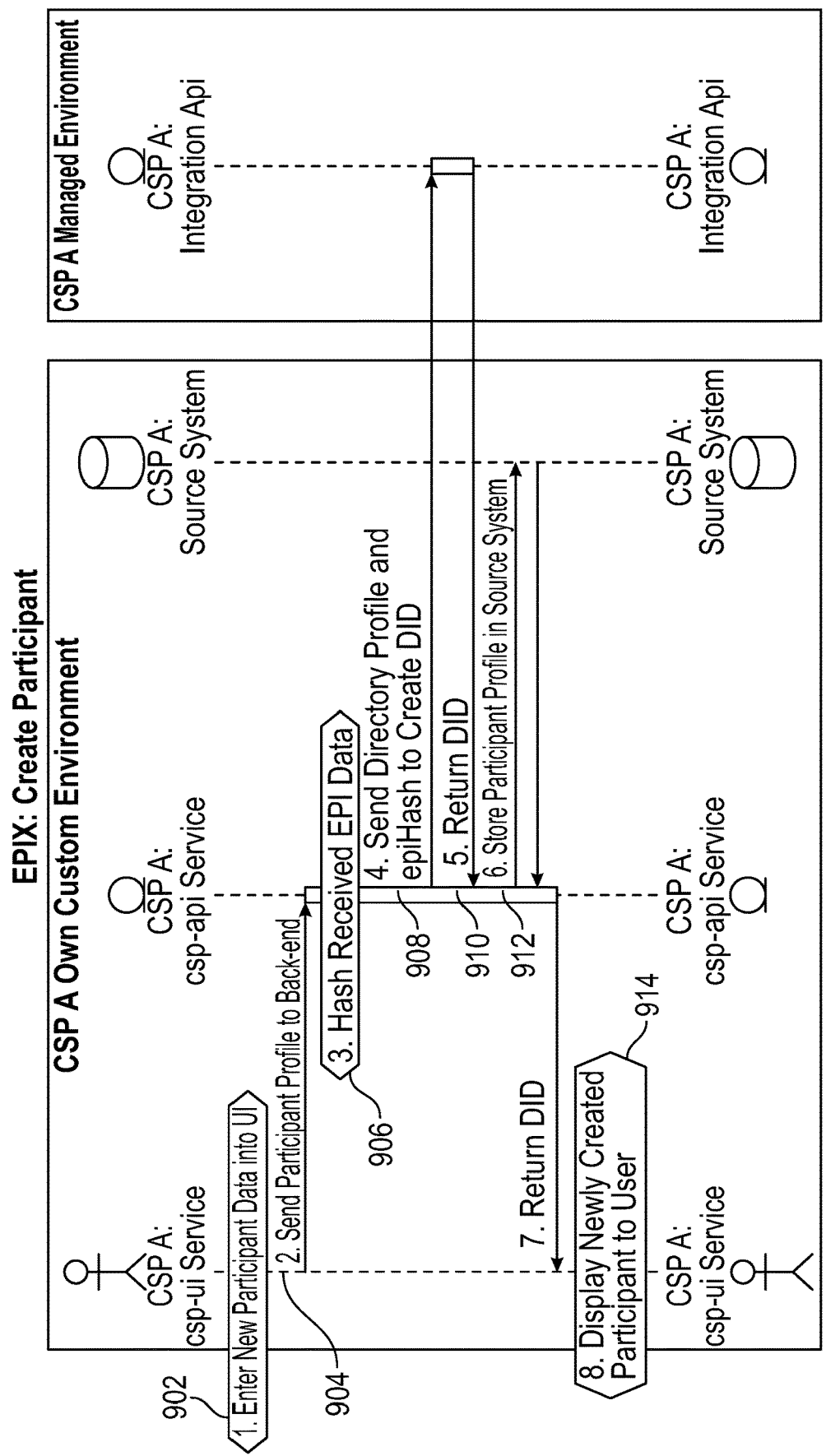
FIG. 9 is a sequence diagram for creation of a new CSP customer/participant for EPI exchange services using the system of FIG. 1.

Of course, in order to effect an EPI exchange service, EPI must first be present and associated with a particular CSP customer. To create such EPI, a requesting CSP may first create a new CSP customer/participant by sending the required information to the integration API 224. Upon successful creation of the new CSP customer/participant, the integration API returns a newly minted DID for the requesting CSP to store with the private data in its own private off-chain database 325. FIG. 9 provides a sequence diagram illustrating the sequence for creation of a new CSP customer/participant for EPI exchange services. As shown in FIG. 9, the CSP user enters new CSP customer/participant data (e.g., using CSP user interface 322) at 902, and at 904 sends that CSP customer/participant profile to the CSP back-end 324. At 906, a hash is received at CSP API service 326 of the EPI data, which ensures that sensitive payee data never leaves the CSP's source system until requested by another CSP with a valid system access token. At 908, the CSP's CSP API service 326 sends 'directoryProfile' and 'epiHash' to CSP Administrator-Managed Services 320 to create a DID for that new CSP customer/participant, wherein integration API 224 handles creating the new CSP customer/participant both in the central directory and on the blockchain. Next, at 910, the DID is returned to the calling CSP API service 326. The CSP then at 912 preferably stores the newly established CSP customer/participant profile in their private off-chain storage 325, and may optionally at 914 return the DID and the newly created CSP customer/participant to the CSP user.

Figure 10:
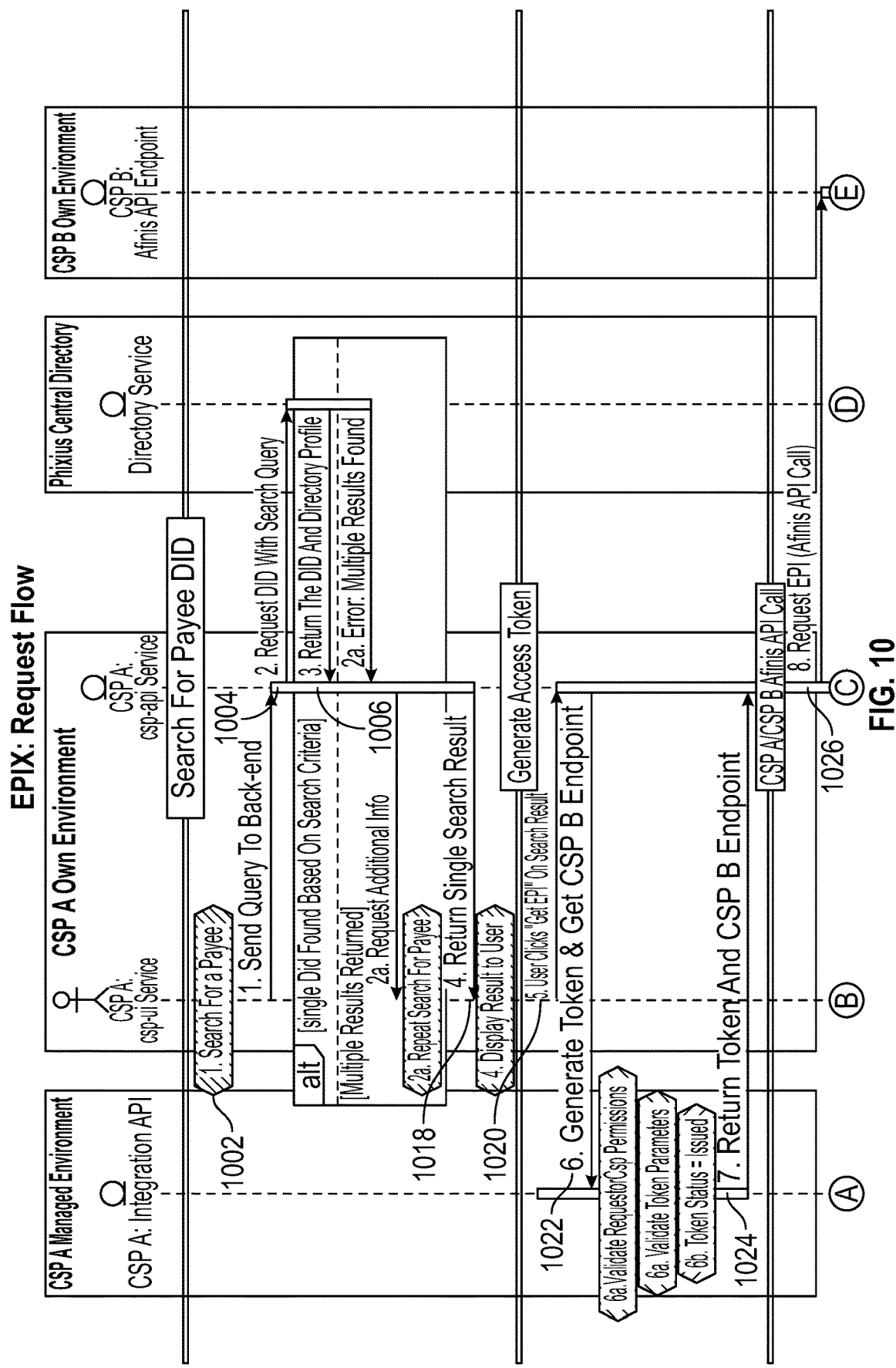
FIG. 10 is a sequence diagram for carrying out an EPI request using the system of FIG. 1.
Figure 10:
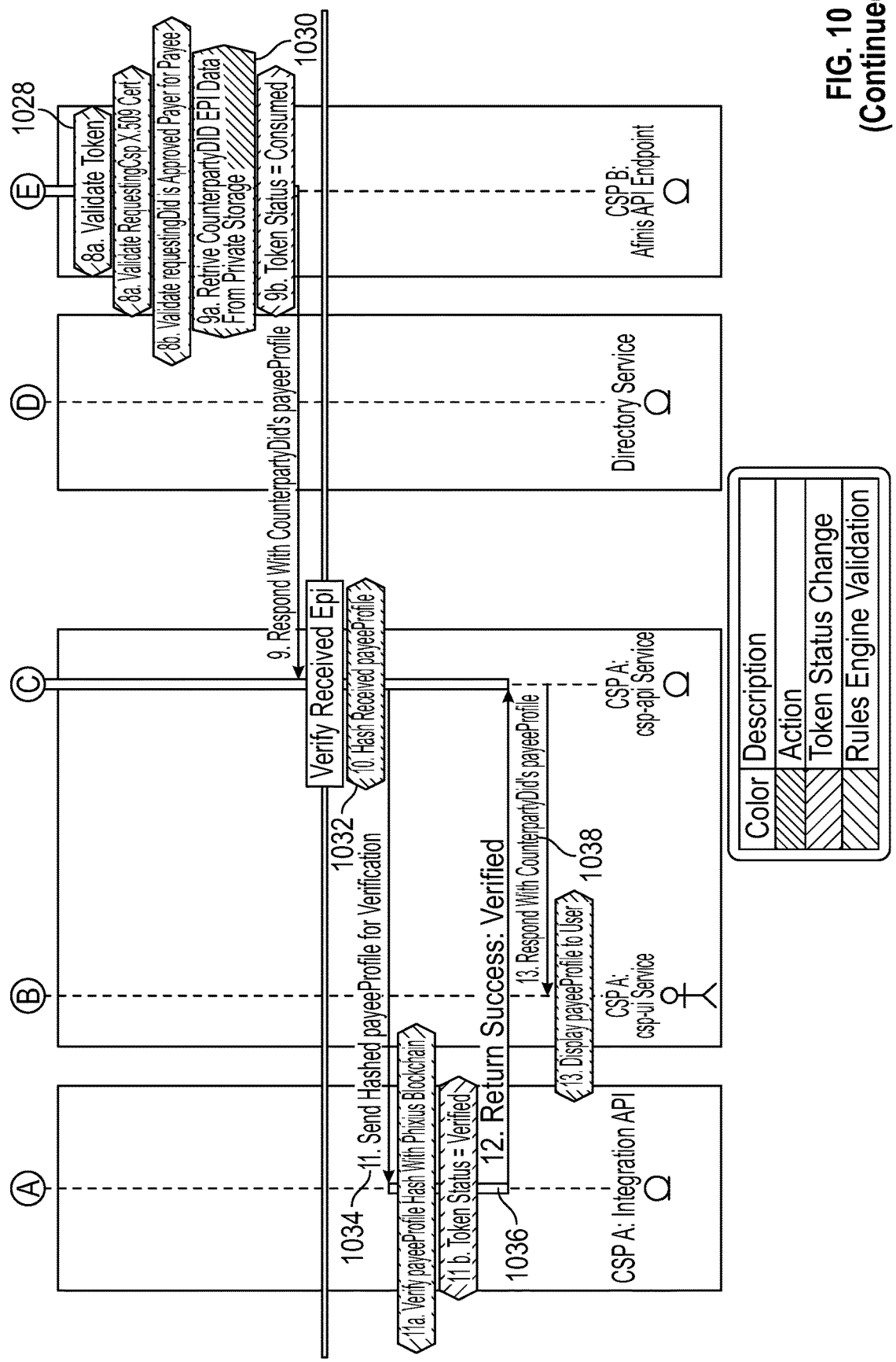

FIG. 10 likewise provides a sequence diagram illustrating the sequence for carrying out an EPI request using system 100, which sequence may be broken down into the four main functions of (i) searching for payee DID; (ii) requesting a system access token; (iii) carrying out a CSP-to-CSP exchange service API call; and (iv) verifying received EPI with the on-chain hash. As shown in FIG. 10, the main function of searching for payee DID may begin with the Requestor CSP user engaging user interface 322 to initiate an end-user search for a specified payee at 1002, using CSP API service 326 at 1004 to make a search request of the central directory. If more than one result matches the provided search query, additional information must be provided to the central directory so that only one result is returned by the provided search query. At 1006, the central directory returns a single, unique DID with the corresponding 'directoryProfile'. Then at 1008, the CSP API returns the relevant values to the user interface 322, which in turn may display the payee information to the end-user.

The main function of requesting a system access token then proceeds with the requestor CSP engaging CSP user interface 322 to request payee information for a specified counterparty DID at 1020. CSP API service 326 then requests a system access token and the counterparty CSP's API endpoint URL at 1022. In processing that request, CSP Administrator-Managed Services 220 validates permissions and token parameters using the rules engine, and upon successful validation creates a new token in "issued" status. Then at 1024, integration API 224 returns the newly created system access token and counterparty CSP's API endpoint URL to the requesting CSP's CSP AIP service 326.

Next, the main function of carrying out a CSP-to-CSP exchange service API call proceeds with the requestor CSP making an API request from their CSP API service 326 to the counterparty CSP's endpoint URL at 1026, and at 1028 the counterparty CSP validates the requestor CSP's x.509 certificate and system access token, and ensures that the payee (counterparty DID) approved the payer (the requestor DID) to retrieve EPI. Next at 1030, upon successful validation, the counterparty CSP returns the payee's information to the requestor CSP by retrieving the requested data from the counterparty's private off-chain storage 325, and changing the system access token status from "issued" to "consumed," and transmitting the requested information to the requestor CSP's CSP API service 326.

Finally, the main function of verifying received EPI with the on-chain hash proceeds with the requestor CSP at 1032 hashing the payload from the counterparty CSP's API response, and sending the hash at 1034 to the integration API 224 for validation. Integration API compares the received hash to the hash stored on the blockchain, and upon successful validation changes the system access token status from "consumed" to "verified." Next, at 1036, the integration API 224 may return a successful response to the requestor CSP, and at 1038 the payee's payment information is sent to the CSP user interface 322 and displayed to the requestor CSP user.

Next and as mentioned above, system 100 may further provide a biller account validation exchange service, which facilitates a query for validating the legitimacy and existence of an account number for a particular biller address, providing additional confidence that a payee's payment will be sent to the correct biller. System 100 provides a common implementation interface for such biller account validation exchange services, and serves as a mechanism to authorize and connect two parties. In a typical implementation of the invention, it will be up to the biller to build an endpoint to specifications, and then integrate it into the backend systems that can complete the lookup. Because in a typical configuration of system 100, system administrator 200 will not have knowledge of customer account numbers, there is no facility for registering accounts, searching accounts, or validating that the account number is accurate. However, system 100 does store a hash of both the query and the counterparty's response on the blockchain in order to provide the requestor CSP with immediate, and future, validation that the information intended for them was received properly.

Figure 11:
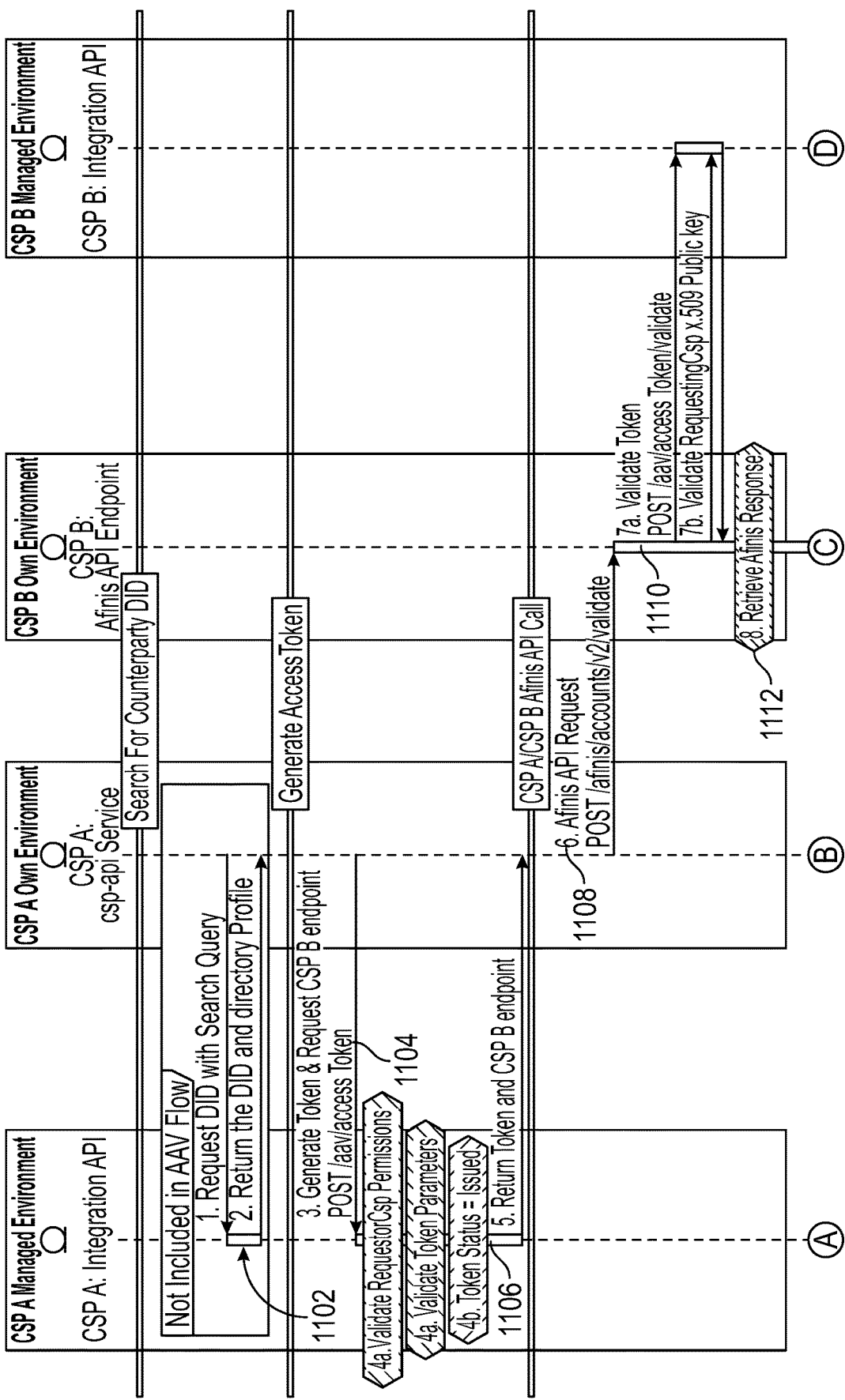
FIG. 11 is a sequence diagram for carrying out an ACH account validation request using the system of FIG. 1.
Figure 11:
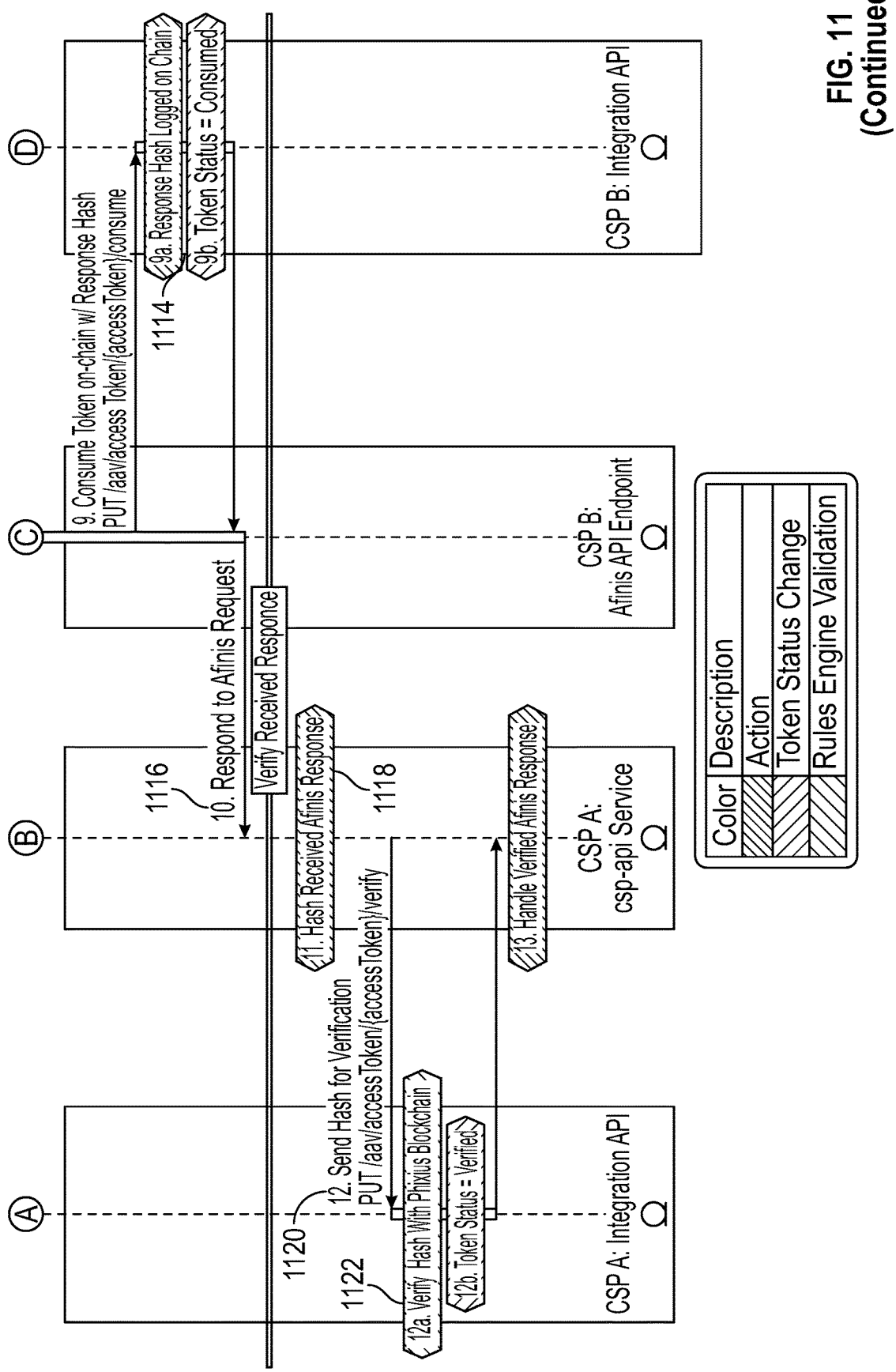

Still further and as mentioned above, system 100 may further provide an ACH account validation exchange service, which facilitates a query for validating the legitimacy and existence of an ACH routing and account number, providing additional confidence that a credit or debit will be accepted. FIG. 11 provides a sequence diagram illustrating the sequence for carrying out an ACH account validation request using system 100. First, a requestor CSP may engage their CSP user interface 322 at 1102 to request from CSP Administrator-Managed Services 220 payee information for a specified counterparty DID, which results in a return to requestor CSP of the requested DID and that third party entity's directory profile. Next, at 1104 the requestor's CSP API service 326 requests a system access token and the counterparty CSP's API endpoint URL. System administrator 200 validates permissions and token parameters using the system rules engine, and upon successful validation creates a new token in "issued" status. At 1106, integration API 224 then returns the newly generated access token and counterparty CSP's API endpoint URL to the requestor's CSP API service 326. At 1108, the requestor uses CSP API service 326 to make an API request to the counterparty CSP's API endpoint URL. At 1110, the counterparty CSP's integration API 224 receives the API request from their counterparty API endpoint, and validates the requestor CSP's x.509 certificate and system access token, and ensures payee (counterparty DID) approved the payer (requestor DID) to validate ACH accounts. Upon successful validation, the counterparty API endpoint URL may retrieve the ACH account response from private off-chain storage at 1112, and the counterparty CSP's integration API 224 may log a hash of the response on the blockchain and change the system access token status from "issued" to "consumed" at 1114, and the counterparty CSP API endpoint may then forward the response to the requestor's CSP API service 326 at 1116. Once received by the requestor's CSP API service 326, at 1118 the requestor CSP hashes the payload from the counterparty CSP's API response, and at 1120 sends the hash to the requestor CSP's integration API 224 for validation. The requestor CSP's integration API then at 1122 compares the received hash to the hash stored on the blockchain, and upon successful validation, the system access token status is changed from "consumed" to "verified." Finally, at 1124 the requestor CSP's integration API 224 returns a successful response to the requestor's CSP API service 326 such that the ACH account validation response may be displayed to the requestor CSP end-use on CSP user interface 322.

In each of the data exchange services provided by system 100, it is an important feature that no private, sensitive information associated with CSP customers is stored on-chain. Rather, all such private information is stored in another secure location (typically at the requesting or responding CSP) that can be wiped or erased in order to disassociate any data from the transacting parties. The DIDs used by system 100 uniquely identifies CSPs when transacting, and these can become publicly known through interactions with others on the network. These values are visible to anyone that is able to read blockchain transactions. The DIDs themselves comprise ambiguous numerical values that do not themselves reveal the identity of the party. Further, signature hashes of updates to private data provide fingerprints of what was changed, using one-way encryption that cannot be decrypted. This allows parties engaging with the private data to verify that the data is authentic, but likewise ensures that prying eyes are unable to make use of it without knowledge of the private data.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

What is claimed is:

1. A system implementing a distributed computer network for an exchange of electronic payment information among electronically connected and networked payment service providers, comprising:

a first payment service provider computer node on said distributed computer network, and a first payment service provider database of first private customer data in data communication with said first payment service provider computer node, wherein said first payment service provider computer node is associated with a first payment service and is in data communication with a first customer computer associated with a first party to a transaction requiring transmission of at least a subset of said first private customer data associated with said first party across said distributed computer network;

a second payment service provider computer node on said distributed computer network, and a second payment service provider database of second private customer data in data communication with said second payment service provider computer node, wherein said second payment service provider computer node is associated with a second payment service and is in data communication with a second customer computer associated with a second party to said transaction, wherein said transaction further requires transmission of at least a subset of second private customer data associated with said second party across said distributed computer network; and a network administrator computer node communicatively coupled to said first payment service provider computer node and said second payment service provider computer node, said network administrator computer node comprising an electronic directory of public payment service provider customer data publicly accessible by said first payment service provider computer node and said second payment service provider computer node, wherein said system prohibits access by said network administrator computer node to said first payment service provider database of said first private customer data and said second payment service provider database of said second private customer data;

said network administrator computer node further comprising a network administrator computer processor and memory storing computer instructions thereon configured to cause said network administrator computer processor to:

receive an electronic request at said network administrator computer node from said first payment service provider computer node for said second private customer data associated with said second party, and transmit from said network administrator computer node to said first payment service provider computer node a system access token and an API URL endpoint associated with said second payment service, wherein said API URL endpoint is formatted to exchange said second private customer data associated with said second party, and wherein said system access token is unique to said transaction;

said first payment service provider computer node further comprising a first payment service provider computer processor and memory storing computer instructions thereon configured to cause said first payment service provider computer processor to:

generate an API call at said first payment service provider computer node to said API URL endpoint associated with said second payment service provider computer node, wherein the API call is formatted to receive said second private customer data associated with said second party; and transmit the API call to said second payment service provider computer node;

said second payment service provider computer node further comprising a second payment service provider computer processor and memory storing computer instructions thereon configured to cause said second payment service provider computer processor to:

receive said API call;

validate said system access token;

transmit from said second payment service provider computer node to said first payment service provider computer node at least said subset of said second private customer data associated with said second party; and complete said transaction securely from all nodes in said distributed computer network other than said first payment service provider computer node and said second payment service provider computer node.

2. The system of claim 1, further comprising a distributed ledger comprised of multiple distributed ledger computer nodes, wherein a single one of said distributed ledger computer nodes is associated with at least each of (i) said network administrator computer node, (ii) said first payment service provider computer node, and (iii) said second payment service provider computer node.

3. The system of claim 2, further comprising a first API service associated with and accessible by said first payment service provider computer node;

said computer instructions of said first payment service provider computer node being further configured to cause said first payment service provider computer processor to:

transmit from said first API service to said network administrator computer node a first hash corresponding to said subset of second private customer data associated with said second party that is transmitted to said first payment service provider computer node; and said computer instructions of said network administrator computer node being further configured to cause said network administrator computer processor to compare, at said network administrator computer node, said first hash to a second hash stored on said distributed ledger, wherein said second hash is associated with said subset of second private customer data associated with said second party.

4. The system of claim 3, wherein said computer instructions of said network administrator computer node are further configured to:

determine at said network administrator computer node that said first hash matches said second hash; and transmit from said network administrator computer node to said first API service a verification that said first hash matches said second hash, wherein said verification validates said system access token.

5. The system of claim 1, said computer instructions on said network administrator computer node being further configured to cause said network administrator computer processor to:

provide a first API service associated with and accessible by said first payment service provider computer node, wherein said first API service provides said API URL endpoint associated with said second payment service provider computer node an API request for verification of an ACH account number;

provide an administrator integration API service associated with said second payment service at said network administrator computer node, and transmit from said administrator integration API service to said API URL endpoint a validated authorization of said API request for verification of said ACH account number; and retrieve at said first API service associated with and accessible by said first payment service provider computer node an ACH account response from private, off-chain data storage at said second payment service provider computer node.

6. The system of claim 5, said computer instructions on said network administrator computer node being further configured to cause said network administrator computer processor to:

provide an administrator integration API service associated with said first payment service at said network administrator computer node, wherein said first API service provides said administrator integration API service associated with said first payment service provider a request for said system access token and said API URL endpoint;

verify, at said integration API service associated with said first payment service, parameters of said system access token; and receive at said first API service, from said integration API service, said system access token and said API URL endpoint associated with said first payment service.

7. The system of claim 6, said computer instructions on said network administrator computer node being further configured to:

receive said ACH account response;

transmit from said first API service to said administrator integration API service associated with said first payment service a first hash corresponding to said ACH account response; and compare at said administrator integration API service said first hash to a second hash stored on a distributed ledger, wherein said second hash is associated with said ACH account response.

8. The system of claim 7, wherein said computer instructions of said network administrator computer node are further configured to:

determine at said administrator integration API service that said first hash matches said second hash; and transmit from said administrator integration API service to said first API service a verification that said first hash matches said second hash, wherein said verification validates said system access token.

9. A method for implementing a distributed computer network for an exchange of electronic payment information among electronically connected and networked payment service providers, comprising:

receiving, at a processor of a network administrator computer node on said distributed computer network, an electronic request from a first payment service provider computer node on said distributed computer network for first private customer data associated with a customer of a second payment service provider computer node on said distributed computer network, wherein:

said first payment service provider computer node is in data communication with a first payment service provider database of first private customer data in data communication with said first payment service provider computer node;

said first payment service provider computer node is associated with a first payment service and is in data communication with a first customer computer associated with a first party to a transaction requiring transmission of at least a subset of said first private data associated with said first party across said distributed computer network;

said second payment service provider computer node is in data communication with a second payment service provider database of second private customer data in data communication with said second payment service provider computer node; said second payment service provider computer node is associated with a second payment service and is in data communication with a second customer computer associated with a second party to said transaction, wherein said transaction further requires transmission of at least a subset of second private customer data associated with said second party across said distributed computer network;

said network administrator computer node is communicatively coupled to said first payment service provider computer node and said second payment service provider computer node;

said network administrator computer node comprises an electronic directory of public payment service provider customer data publicly accessible by said first payment service provider computer node and said second payment service provider computer node; and said system prohibits access by said network administrator computer node to said first payment service provider database of said first private customer data and said second payment service provider database of said second private customer data;

transmitting, by the processor of said network administrator computer node to said first payment service provider computer node, a system access token and an API URL endpoint associated with said second payment service provider, wherein said API URL endpoint is formatted to exchange said second private customer data associated with said second party;

generating, by a processor of said first payment service provider computer node, an API call to said API URL endpoint associated with said second payment service provider computer node, wherein the API call is formatted to receive said second private customer data associated with said second party;

transmitting, by the processor of said first payment service provider computer node to said second payment service provider computer node, said API call;

receiving, by a processor of said second payment service provider computer node, said API call;

validating, by the processor of said second payment service provider computer node, said system access token; and transmitting, by the processor of said second payment service provider computer node to said first payment service provider computer node, at least said subset of said second private customer data associated with said second party, completing said transaction securely from all nodes in said distributed computer network other than said first payment service provider computer node and said second payment service provider computer node.

10. The method of claim 9, wherein said distributed computer network further comprises a distributed ledger comprised of multiple distributed ledger computer nodes, wherein a single one of said distributed ledger computer nodes is associated with at least each of (i) said network administrator computer node, (ii) said first payment service provider computer node, and (iii) said second payment service provider computer node.

11. The method of claim 10, further comprising transmitting, by the processor of said first payment service provider computer node, from a first API service associated with and accessible by said first payment service provider computer node to said network administrator computer node a first hash corresponding to said subset of second private customer data associated with said second party that is transmitted to said first payment service provider computer node; and comparing, by the processor of said network administrator computer node, at said network administrator computer node said first hash to a second hash stored on said distributed ledger, wherein said second hash is associated with said subset of second private customer data associated with said second party.

12. The method of claim 11, further comprising determining, by the processor of said network administrator computer node, that said first hash matches said second hash; and transmitting, by the processor of said network administrator computer node, to said first API service a verification that said first hash matches said second hash, wherein said verification validates said system access token.

13. The method of claim 9, further comprising providing, by the processor of said network administrator computer node, a first API service associated with and accessible by said first payment service provider computer node, wherein said first API service provides said API URL endpoint associated with said second payment service provider computer node an API request for verification of an ACH account number;

providing, by the processor of said network administrator computer node, an administrator integration API service associated with said second payment service at said network administrator computer node, and transmitting from said administrator integration API service to said API URL endpoint a validated authorization of said API request for verification of said ACH account number; and retrieving, by the processor of said network administrator computer node, at said first API service associated with and accessible by said first payment service provider computer node an ACH account response from private, off-chain data storage at said second payment service provider computer node.

14. The method of claim 13, further comprising providing, by the processor of said network administrator computer node, an administrator integration API service associated with said first payment service at said network administrator computer node, wherein said first API service provides said administrator integration API service associated with said first payment service a request for said system access token and said API URL endpoint; and verifying, by the processor of said network administrator computer node, said integration API service associated with said first payment service of parameters of said system access token; and receiving, by the processor of said network administrator computer node, at said first API service, from said integration API service, said system access token and said API URL endpoint associated with said first payment service.

15. The method of claim 14, further comprising to receiving, by the processor of said network administrator computer node, said ACH account response;

transmitting, by the processor of said network administrator computer node, from said first API service to said administrator integration API service associated with said first payment service a first hash corresponding to said ACH account response; and comparing, by the processor of said network administrator computer node, at said administrator integration API service said first hash to a second hash stored on a distributed ledger, wherein said second hash is associated with said ACH account response.

16. The method of claim 15, further comprising determining, by the processor of said network administrator computer node, at said administrator integration API service that said first hash matches said second hash; and transmitting, by the processor of said network administrator computer node, from said administrator integration API service to said first API service a verification that said first hash matches said second hash, wherein said verification validates said system access token.

* * * * *